United States Patent
Bothe et al.

(10) Patent No.: US 7,619,650 B2
(45) Date of Patent: Nov. 17, 2009

(54) IMAGING SENSOR THAT MONITORS OPERABILITY OF THE IMAGING SENSOR

(75) Inventors: Hans-Dieter Bothe, Seelze (DE); Hoang Trinh, Hildesheim (DE); Heiko Freienstein, Hildesheim (DE); Thomas Engelberg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 514 days.

(21) Appl. No.: 10/532,375

(22) PCT Filed: Jul. 25, 2003

(86) PCT No.: PCT/DE03/02507
§ 371 (c)(1),
(2), (4) Date: Mar. 24, 2006

(87) PCT Pub. No.: WO2004/045912
PCT Pub. Date: Jun. 3, 2004

(65) Prior Publication Data
US 2006/0187303 A1    Aug. 24, 2006

(30) Foreign Application Priority Data
Nov. 16, 2002    (DE)    ............................... 102 53 501

(51) Int. Cl.
*H04N 17/02*    (2006.01)
*H04N 7/18*    (2006.01)
*G06K 9/00*    (2006.01)
(52) U.S. Cl. .................. 348/187; 348/148; 382/152
(58) Field of Classification Search .................. 348/129, 348/131, 132, 187, 148; 382/152
See application file for complete search history.

(56) References Cited

U.S. PATENT DOCUMENTS

| | | | | | |
|---|---|---|---|---|---|
| 4,608,593 | A | * | 8/1986 | Miyaji et al. | 348/263 |
| 4,772,945 | A | * | 9/1988 | Tagawa et al. | 348/155 |
| 5,309,376 | A | * | 5/1994 | Barraco et al. | 702/108 |
| 5,581,625 | A | * | 12/1996 | Connell | 382/100 |
| 5,822,542 | A | * | 10/1998 | Smith et al. | 709/247 |
| 5,845,000 | A | * | 12/1998 | Breed et al. | 382/100 |
| 6,726,103 | B1 | * | 4/2004 | Motta et al. | 235/454 |
| 6,841,780 | B2 | * | 1/2005 | Cofer et al. | 250/341.1 |
| 7,310,109 | B2 | * | 12/2007 | Dottling et al. | 348/82 |
| 7,324,628 | B2 | * | 1/2008 | Liu et al. | 378/117 |
| 7,373,395 | B2 | * | 5/2008 | Brailean et al. | 709/219 |
| 2002/0105582 | A1 | * | 8/2002 | Ikeda | 348/231.3 |
| 2007/0115357 | A1 | * | 5/2007 | Stein et al. | 348/148 |

FOREIGN PATENT DOCUMENTS

| | | |
|---|---|---|
| DE | 197 57 118 | 7/1999 |
| EP | 0 246 085 | 11/1987 |
| EP | 0 332 715 | 9/1989 |
| JP | 10 322513 | 12/1998 |
| WO | 01/60662 | 8/2001 |

\* cited by examiner

*Primary Examiner*—John M Villecco
(74) *Attorney, Agent, or Firm*—Kenyon & Kenyon LLP

(57) ABSTRACT

An imaging sensor disposed in a vehicle includes an evaluation unit for monitoring the imaging sensor's operability based on an image signal, for example, by an evaluation of invariant patterns, empirical knowledge about measurement signal profiles, utilizing the redundancy of a network of sensors, or utilizing time-related redundancy.

10 Claims, 4 Drawing Sheets

IMAGING SENSOR THAT MONITORS OPERABILITY OF THE IMAGING SENSOR

FIELD OF THE INVENTION

The present invention relates to an imaging sensor.

BACKGROUND INFORMATION

Imaging sensors may be applicable to safety-relevant applications such as vehicle occupant protection systems. An imaging sensor that is disposed in a vehicle is discussed in published international patent document WO 01/60662. It is used therein for seat occupancy detection. A conventional imaging sensor requires additional sensors for monitoring the imaging sensor's operational capabilities.

SUMMARY

In an example embodiment of the present invention, an imaging sensor may monitor its operability on the basis of its image signal. A safety requirement for an image recognition system of this kind may be thereby met. Thus, an additional sensor suite for monitoring operability may be no longer necessary, or the demands on additional monitoring apparatuses may be reduced. The imaging sensor may be used, e.g., for occupant detection, determination of the occupant's posture, for classification of the occupancy situation, surroundings monitoring, and/or rollover detection.

In an example embodiment, the imaging sensor may have an evaluation unit that may derive from the image signal at least one value that the evaluation unit may compare with at least one limit value in order to monitor operability. Empirical knowledge about measurement signal profiles may then be incorporated. In one example embodiment, the derived value may be compared with a limit value set that is stored in a memory associated with the imaging sensor. In an example embodiment, a system state may be determined by a comparison with several limit values. The system state may be then transmitted via an interface to further systems. The interface may be embodied, e.g., as a two-wire interface, for example to a control unit, or as a bus interface. Optical, electrical, or radio bus configurations, for example, may be used therefore.

In an example embodiment, the imaging sensor may generate the image signal on the basis of at least one invariant pattern. That invariant image signal may be then used for self-monitoring by being compared with an internal reference pattern. Naturally occurring invariant features of the surroundings; invariant features automatically induced by a system, for example using an illumination module; or artificially induced invariant features of the surroundings, for example targets that are provided or generated by a test image procedure, may be used for this purpose. In the test image procedure, a simulated sensor signal may be conveyed to the evaluation unit. The associated measurement signal may be predefined. Discrepancies may then result in an error message.

In an example embodiment, the imaging sensor may monitor its operability on the basis of a profile of the image signal. This can be accomplished, for example, by way of a simple comparison of adjacent regions of the imaging sensor. A pattern comparison, i.e., a comparison with qualitative signal profiles, may also be possible here. Trends or statistical parameters may be analyzed, or correlation methods may be applied to the image signal profile. Spectral methods such as analysis of the Fourier spectrum, the wavelet spectrum, or the contrast spectrum may also be applied here.

In an example embodiment, if the imaging sensor has at least two image-producing sensors, it may check its operability by comparing the output signals of those two image-producing sensors. The redundancy of a network of high-resolution sensors, for example an array or also a stereocamera, may thereby be utilized. Methods for analysis of the image signal profile may be applicable here as well. Utilization of a time-related redundancy may also be possible here, by way of a time-related analysis of the sensor signal or analysis of recorded dynamic processes.

The self-monitoring of the imaging sensor may be performed in an initialization phase. It may also be performed continuously or intermittently during operation.

In an example embodiment, the imaging sensor may be connectable to a diagnostic unit that may activate the self-monitoring of the imaging sensor. The diagnostic unit may be disposed in the vehicle and/or outside the vehicle, in order then to perform the self-monitoring via a radio connection. An expanded test program may also be performed in the event of an activation by the diagnostic unit, since it may be possible, for example, to transfer pattern files or also to perform long-term tests. In an example embodiment, the imaging sensor may be manually activatable for self-monitoring. The imaging sensor may then have corresponding operating elements or interfaces which may initiate the self-monitoring by way of an actuation of a device.

In an example embodiment, the imaging sensor may be configured in depth-imaging fashion, e.g., two image sensors may be used in order to obtain depth resolution of an object. A matrix or an array of image sensors may also be used for this. A depth-imaging sensor that operates according to different physical principles, for example the time-of-flight principle or the principle of structured illumination, may also be used. In an example embodiment, an illumination apparatus that is associated with the imaging sensor may be provided, e.g., for self-monitoring or other purposes.

DETAILED DESCRIPTION

Highly developed high-resolution image-producing or depth-image-producing measurement systems are of increasing interest for applications in automotive engineering. For example, such systems may be applied to video-based assistance systems and safety systems. The more responsibility transferred from human beings, the more reliable such a measurement system must be. The ability of the system to detect a failure and initiate suitable actions may therefore be important. In an example embodiment of the present invention, an imaging sensor may be provided that may be configured for self-monitoring. The imaging sensor may be built into a motor vehicle. The self-monitoring capability may be integrated into a high-resolution image-producing or depth-image-producing measurement system.

Since such measurement systems for measured value generation may have at least one high-performance evaluation unit, self-monitoring may be implemented via the evaluation unit. The evaluation unit may use signal processing to ascertain, from the sensor signals themselves, variables that allow conclusions as to the operational capability of the sensor and the measurement system. Previous knowledge and empirical knowledge about signal profiles may be evaluated in suitable fashion. In the one example embodiment, a parameter that has been derived from the image signal may be compared with a limit value or a limit value set that may be stored in a memory associated with the imaging sensor.

In another example embodiment, an evaluation of the system status may be performed on the basis of several different variables. If limit values are exceeded or if a limited operability (up to and including sensor failure) is identified in another fashion, failure of the imaging sensor may be reported. For example, a corresponding status report may be transmitted via a suitable interface. Otherwise the operational capability of the imaging sensor may be transmitted via the interface. The self-monitoring may be performed during the initialization phase of the imaging sensor, at certain points in time, or continuously. The self-monitoring may also be activated externally, e.g., by way of a higher-order system such as a diagnostic unit, or manually. An expanded test program may also be performed in the event of an activation by the diagnostic unit, since it may be possible, for example, to transfer pattern files or also to perform long-term tests.

Figure 1:
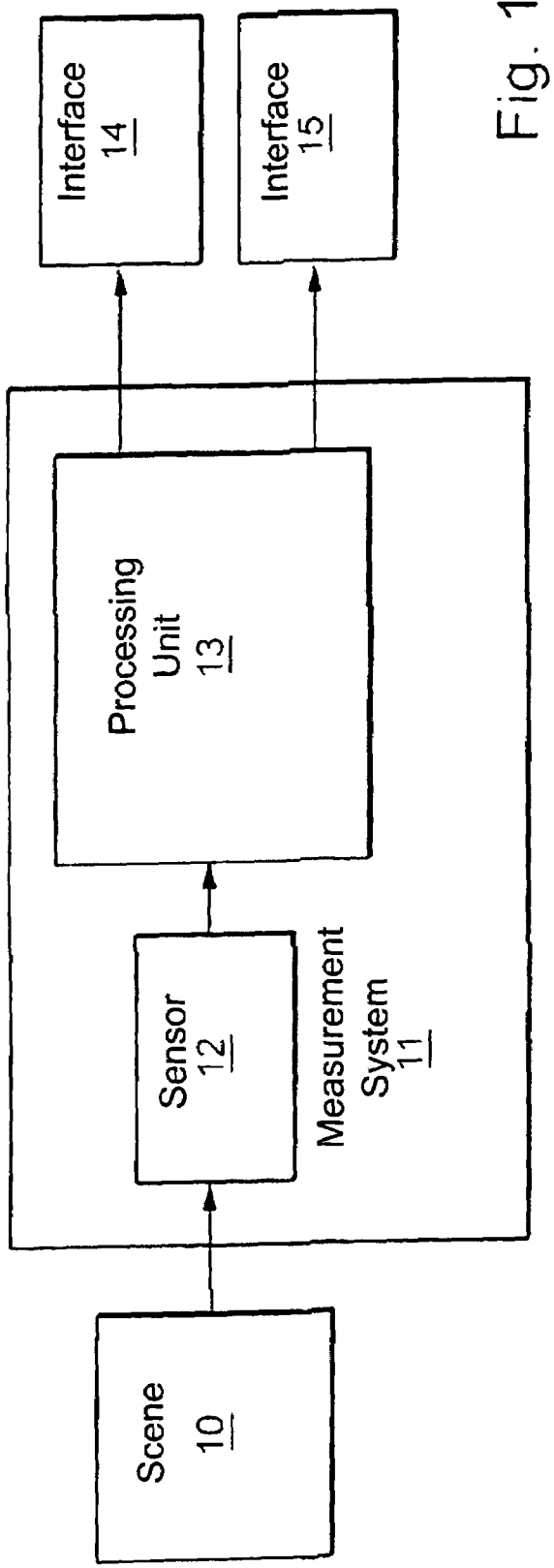
FIG. 1 is a first block diagram of the imaging sensor according to an example embodiment of the present invention.

FIG. 1 is a block diagram that shows an imaging sensor according to an example embodiment of the present invention. Scene 10, e.g., physical surroundings, may be imaged by sensor 12 as an image signal. A measurement system 11 may include a sensor 12 and a processing unit 13. The image signal generated by sensor 12 may be prepared and processed by processing unit 13. The measurement signal, i.e., the image signal, may be transferred via a first interface 14 to further systems, for example to a control unit for occupant detection.

The status of the imaging sensor may be determined by the measurement system 11 on the basis of the image signal. The determined status may be transferred via a further interface 15. The status of the imaging sensor, i.e., its self-monitoring, may be performed, e.g., by utilizing previous knowledge about its invariant patterns, empirical knowledge about measurement signal profiles, the redundancy of a network of sensors, or time-related redundancy. In one example embodiment, interfaces 14 and 15 may be combined into one interface, and may be separated only logically. The interfaces may be, e.g., two-wire interfaces or interfaces to a bus system.

Figure 2:
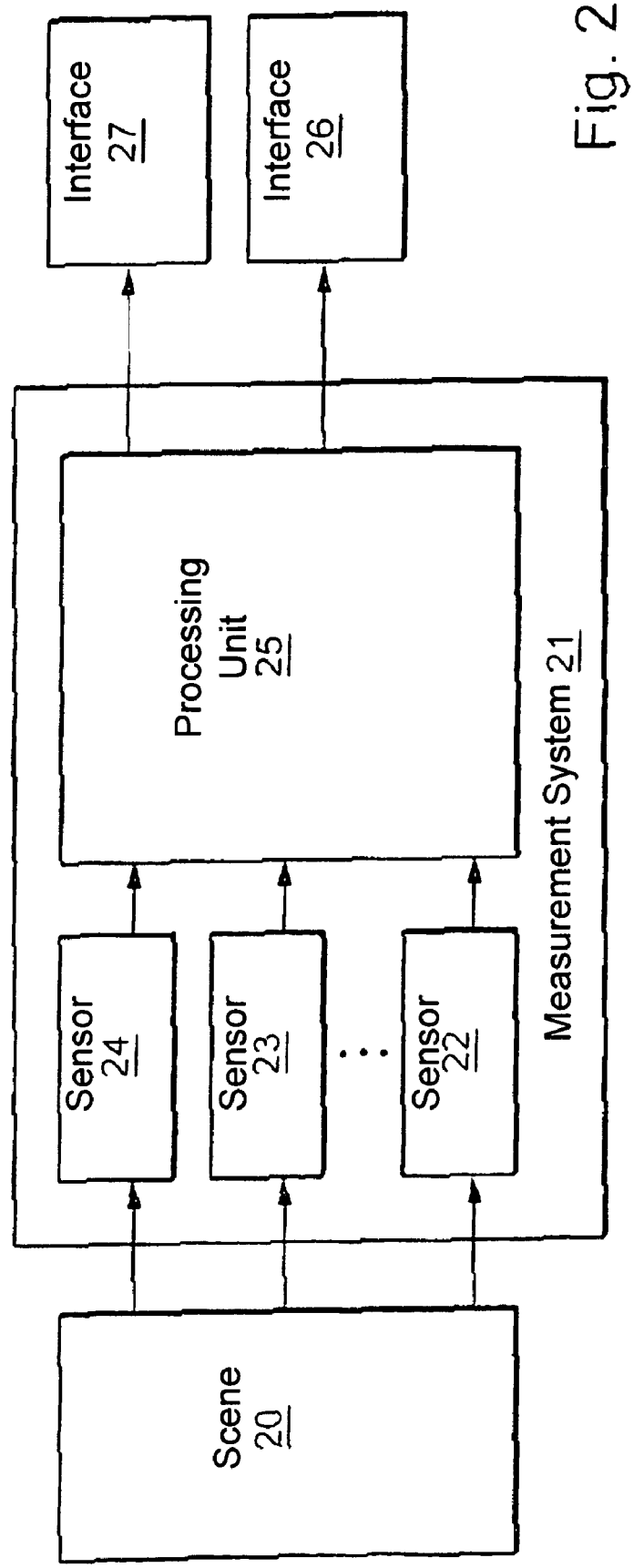
FIG. 2 is a second block diagram of the imaging sensor according to an example embodiment of the present invention.

FIG. 2 is a block diagram that shows an imaging sensor that has more than one sensor for image acquisition and is thus also configured for depth-image production. Three sensors 22 through 24 are depicted here by way of example, although only two sensors or also more sensors may be used. Measurement system 21 may therefore include sensors 22 through 24 and processing unit 25. Scene 20, e.g., physical surroundings, may be imaged by sensors 22-24. Processing unit 25 may receive the image signals of image sensors 22 through 24, process them, and then, based on the evaluation of those image signals, convey signals to interfaces 26 and 27 in order to transfer on the one hand the status of the imaging sensor and on the other hand the measurement signal itself. Sensors 22 through 24 may be connected to individual interface modules of processing unit 25, but they may also be connected to processing unit 25 via a multiplexer or an internal bus. In one example embodiment, the imaging sensor may be embodied in one physical unit in which interfaces 26 and 27 may also be integrated. In an alternative example embodiment, these components may be disposed in a distributed fashion, without a housing for the entirety of these components. Processing unit 25 may then perform the analysis of the image signal in order to perform the self-monitoring of the imaging sensor.

Figure 3:
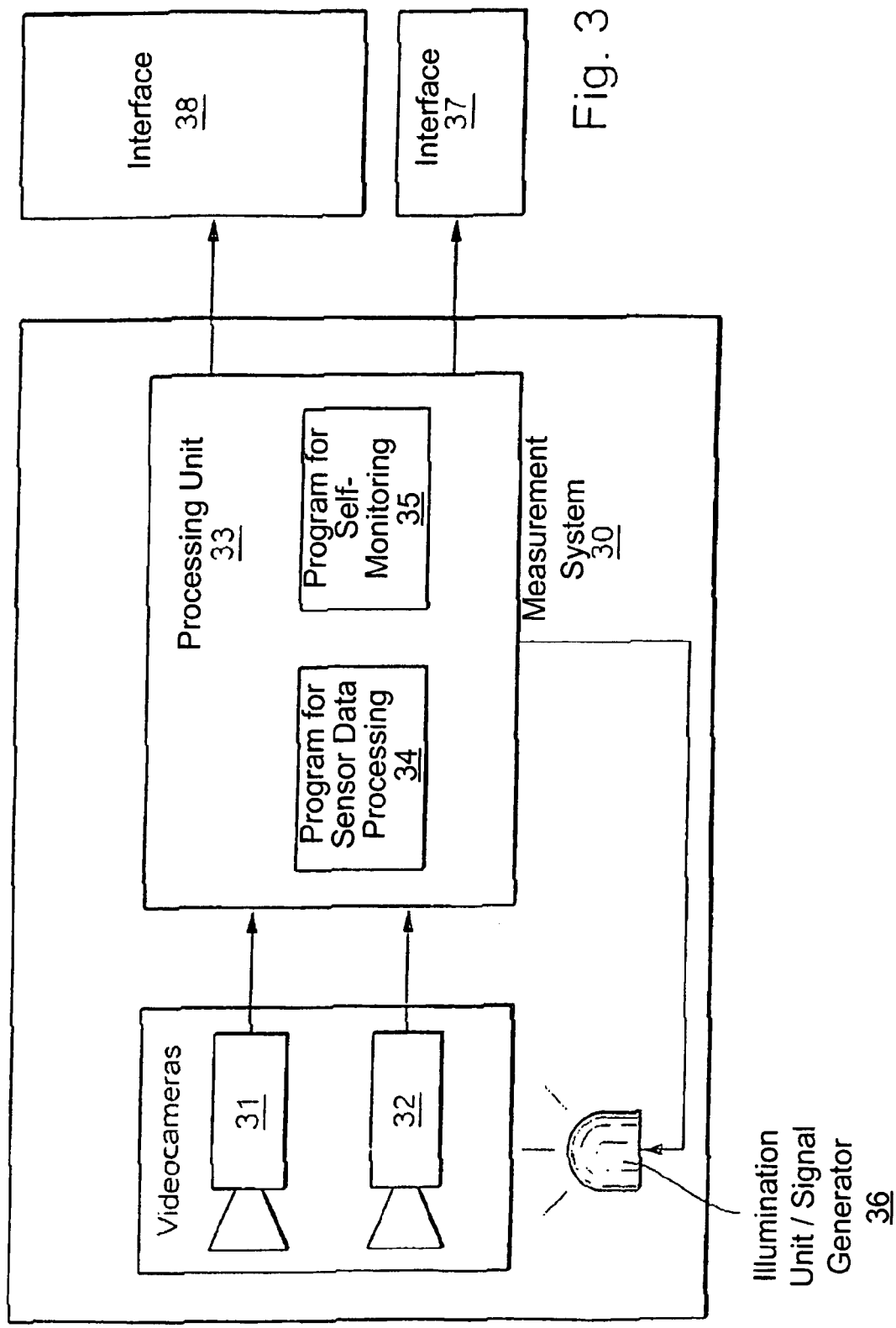
FIG. 3 is a third block diagram of the imaging sensor according to an example embodiment of the present invention.

FIG. 3 is a block diagram that shows the imaging sensor according to an example embodiment of the present invention.

Two sensors, video cameras 31 and 32, may be connected to a processing unit 33. The latter may have a program 34 for sensor data processing and a program 35 for self-monitoring. Self-monitoring, facilitated by program 35, may be performed on the image signals of video cameras 31 and 32. In addition, processing unit 33 may control an illumination unit or a signal generator 36, for example in order to perform the self-monitoring by comparing self-induced patterns with their internal representation. Processing unit 33 may be connected to interfaces 37 and 38 that may serve to transfer respectively the measurement signal, e.g., the image or depth image, and the status or the result of the self-monitoring.

Measurement system 30 may thus include processing unit 33, illumination unit 36, and sensors, e.g., video cameras 31 and 32. The overall imaging sensor may be supplemented with interfaces 37 and 38. The output signals may be conveyed to processing unit 33, e.g., an evaluation unit, which may perform suitable procedures such as image processing, correlation procedures, or triangulation in order to generate the spatial data. The processing unit 33 may also perform suitable procedures for self-monitoring of the measurement system. In an example embodiment, the output signals of the video measurement system may be the image, the depth image, and the status signal of measurement system 30.

The table below lists potential problems that can result in limited operability of the embodied measurement system. Columns 2 and 3 contain the appropriate data and signal processing procedures for identifying the limited operability.

| Problem | Data analyzed | Selection of self-monitoring procedures |
|---|---|---|
| Sensor is (partly) obstructed | Grayscale image of sensor 1 | Utilize previous knowledge about invariant patterns: Naturally occurring invariant features of the surroundings. Invariant features induced automatically (e.g. using an illumination module), by the system. Utilize time-related redundancy: Time-related analysis of sensor signal. Analysis of recorded dynamic processes. |
|  | Grayscale image of sensor 2 | see Grayscale image of sensor 1 |
|  | Grayscale images of sensors 1 and 2 | Utilize empirical knowledge about measurement signal profiles: Analysis of statistical parameters Utilize redundancy of a network of high-resolution |

-continued

| Problem | Data analyzed | Selection of self-monitoring procedures |
|---|---|---|
| | Depth image | sensors: compare various individual sensor signals of the sensor network see Grayscale image of sensor 1 |
| Decalibration detection | Grayscale image of sensor 1 | Utilize previous knowledge about invariant patterns: Naturally occurring invariant features of the surroundings. Invariant features induced automatically (e.g. using an illumination module) by the system. |
| | Grayscale image of sensor 2 | see Grayscale image of sensor 1 |
| | Grayscale images of sensors 1 and 2 | Utilize redundancy of a network of high-resolution sensors: compare various individual sensor signals of the sensor network |
| Errors in brightness setting | Grayscale image of sensor 1 | Utilize empirical knowledge about measurement signal profiles: Simple comparison of adjacent regions of sensor Comparison with limit values Comparison with qualitative signal profiles Analysis of trends Analysis of statistical parameters Analysis of further spectral properties Utilize time-related redundancy: Time-related analysis of sensor signal. Analysis of recorded dynamic processes. |
| | Grayscale image of sensor 2 | see Grayscale image of sensor 1 |
| | Grayscale images of sensors 1 and 2 | Utilize redundancy of a network of high-resolution sensors: compare various individual sensor signals of the sensor network |
| Errors in image sharpness (defocusing) | Grayscale image of sensor 1 | Utilize empirical knowledge about measurement signal profiles: Analysis of statistical parameters Analysis of contrast spectrum Analysis of further spectral properties Utilize time-related redundancy: Time-related analysis of sensor signal. Analysis of recorded dynamic processes. |
| | Grayscale image of sensor 2 | see Grayscale image of sensor 1 |
| | Grayscale images of sensors 1 and 2 | Utilize redundancy of a network of high-resolution sensors: compare various individual sensor signals of the sensor network |

In an example embodiment of the present invention, the video measurement system may be a high-resolution image-producing or depth-image-producing measurement system, e.g., a stereoscopic video-based measurement system, to which many of the aforementioned signal-processing or pattern-recognition procedures may be applied for self-monitoring. In an example embodiment, a largely independent generation of the individual sensor signals may provide powerful self-monitoring.

Figure 4:
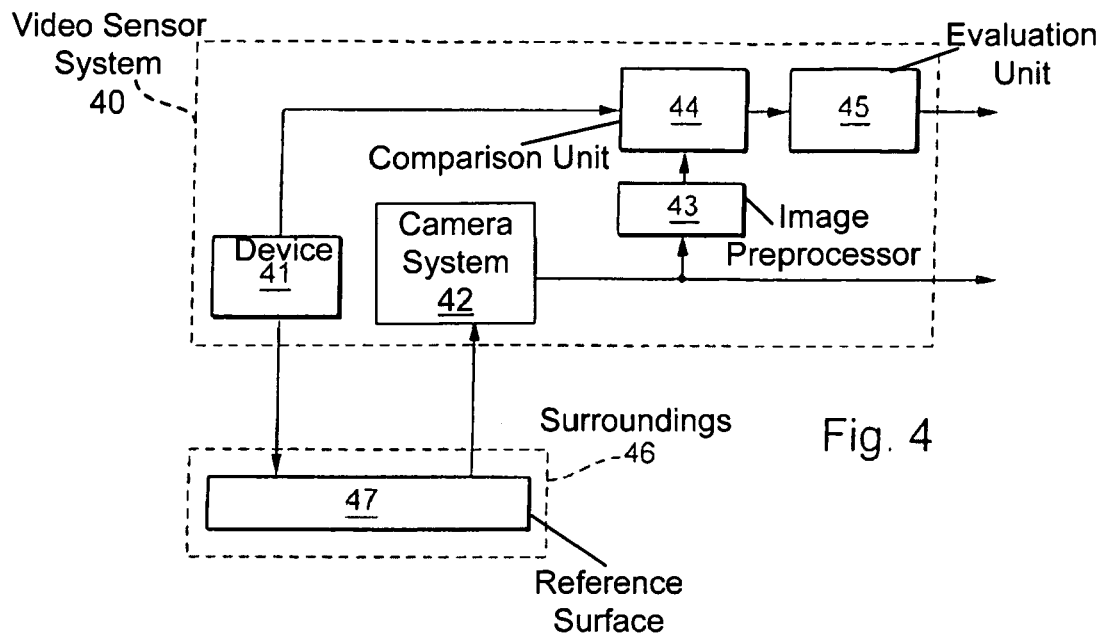
FIG. 4 is a fourth block diagram of the imaging sensor according to an example embodiment of the present invention.

FIG. 4 is a block diagram of the imaging sensor according to an example embodiment of the present invention. A video sensor system 40 may include a camera system 42 that may be connected on the one hand to an image preprocessor 43 and on the other hand to an output of the video sensor system. Image preprocessor 43 may be connected to a comparison unit 44 that may be connected via an output to an evaluation unit 45 and via an input to device 41 for structured illumination. Evaluation unit 45 may supply the sensor status via an output of video sensor system 40.

Device 41 for structured illumination may radiate structured light, constituting a reference pattern, into the surroundings 46 of video sensor system 40, e.g., onto a surface 47 on which the reference pattern may be imaged. The surface may be referred to as reference surface 47. Reference surface 47 may be rigid and stationary. Example reference surfaces may be object surfaces present in the sensing region of video sensor system 40, for example a roof liner when the sensor is used to monitor a motor vehicle interior. In one example embodiment, special calibration elements may be provided that, for example, may be mounted in a defined location and orientation during the manufacturing process.

Camera system 42, which may include one or more cameras, may sense the reference pattern on reference surface 47. The two-dimensional camera images may be compared in comparison unit 44 to the reference pattern; the two-dimensional camera images may also be ones that were prepared in the optional image preprocessor 43. That preparation can be a filtration. Comparison unit 44 may have a memory unit in which, for example, the reference patterns may be stored, if they are not conveyed from the unit for structured illumination in the form of a signal. The sensor status may then be ascertained in evaluation unit 45 on the basis of the results of comparison unit 44. Whether the sensor is obstructed or unobstructed and/or the sensor optics are focused or unfocused and/or the optical image is distorted or undistorted may be regarded, for example, as the sensor status. Evaluation unit 45 may also contain a memory in which, for example, specific patterns may be stored that may be created upon comparison of the reference pattern with the camera images of a faulty video sensor system.

With the device described above it may be possible, for example, to identify a defocusing of the sensor by analyzing whether a sharp image of the reference pattern is present in the camera image. Complete or partial obstruction of the sensor may be detected by checking whether the reference pattern is imaged in complete and undistorted fashion in the camera image. Distortions of the optical image may result in distorted imaging of the reference pattern in the camera image, and may thus be identified using comparison unit 44 and evaluation unit 45. Further errors that may be detected with this system may be soiling of the optics, and misalignment of the absolute calibration. Here the resulting shift and distortion of the reference pattern may be detected. An initial calibration or post-calibration may be performed on these data.

In one example embodiment, device 41 for structured illumination may be integrated into the video sensor. In an alternative example embodiment, a device for structured illumination may be provided separate from the video sensor, e.g., in the manufacturing process and/or for checking the video sensor at a repair shop. According to the latter embodiment, a defined orientation of the device for structured illumination with respect to the video sensor may be necessary. In an example embodiment, the video image of the structured illumination may be interpreted directly. In an example embodiment, an evaluation of a three-dimensional image may also be possible.

Figure 5:
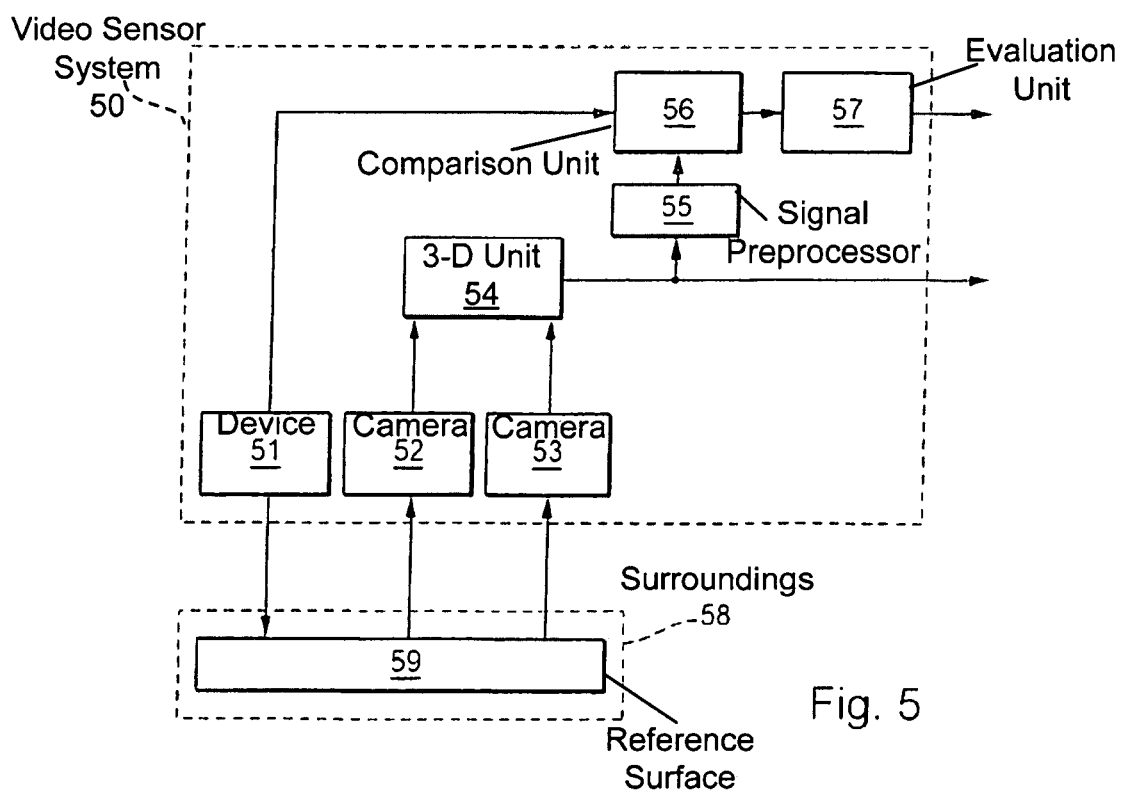
FIG. 5 is a fifth block diagram of the imaging sensor according to an example embodiment of the present invention.

FIG. 5 is a block diagram according to an example embodiment of the present invention. A video sensor system 50 may have two cameras 52 and 53 that may supply their respective camera images to a unit 54 for determining three-dimensional measured values. A three-dimensional point cloud may then result therefrom and may be conveyed on the one hand to a signal preprocessor 55 and on the other hand to an output of video sensor system 50. Signal preprocessor 55 may be connected to a comparison unit 56 to which a device 51 for structured illumination may be connected. Comparison unit 56 may be connected via a data output to an evaluation unit 57 that in turn may output the sensor status.

Device 51 for structured illumination may illuminate a reference surface 59 in surroundings 58 of the video sensor. The reflected pattern may be acquired by cameras 52 and 53. Unit 54 may determine the three-dimensional point cloud from the camera images based on the stereo measurement principle. In addition to determination of the three-dimensional point cloud, the two-dimensional camera images may also be evaluated directly. In an example embodiment, the three-dimensional measured values may be evaluated using a range sensor that operates on the time-of-flight principle.

What is claimed is:

1. An imaging sensor disposed in a vehicle, comprising:
   an image acquisition unit for generating at least one image signal; and
   an evaluation unit configured to monitor the imaging sensor's operability based on the image signal;
   wherein the image acquisition unit includes a first image-producing sensor and a second image-producing sensor, and wherein the at least one image signal includes a first image signal provided by the first image-producing sensor and a second image signal provided by the second image-producing sensor, and wherein the operability is determined based on a comparison of the first image signal with the second image signal.

2. The imaging sensor according to claim 1, wherein the evaluation unit derives from the at least one image signal at least one value and compares the at least one value with at least one limit value to monitor the imaging sensor's operability.

3. The imaging sensor according to claim 2, further comprising:
   an interface, wherein an indication of the operability is transferred via the interface.

4. The imaging sensor according to claim 2, wherein the at least one image signal is generated based on at least one invariant pattern.

5. The imaging sensor according to claim 2, wherein the operability is determined based on a profile of the at least one image signal.

6. The imaging sensor according to claim 2, wherein the operability is monitored during an initialization phase.

7. The imaging sensor according to claim 2, wherein the imaging sensor is connectable to a diagnostic unit that activates the evaluation unit to monitor the operability.

8. The imaging sensor according to claim 2, wherein the evaluation unit is manually activatable to monitor the operability.

9. The imaging sensor according to claim 2, wherein the imaging sensor is configured to produce an image having depth resolution.

10. The imaging sensor according to claim 1, further comprising:
    an illumination device configured to provide a pattern, wherein the image acquisition unit generates the image signal based on the pattern.

* * * * *

UNITED STATES PATENT AND TRADEMARK OFFICE
CERTIFICATE OF CORRECTION

PATENT NO.      : 7,619,650 B2                                          Page 1 of 1
APPLICATION NO. : 10/532375
DATED           : November 17, 2009
INVENTOR(S)     : Bothe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Twenty-sixth Day of October, 2010

David J. Kappos
*Director of the United States Patent and Trademark Office*